Dec. 20, 1927.

J. T. SMITH

MOLDING DEVICE

Filed June 17, 1924

INVENTOR

BY

ATTORNEY

Dec. 20, 1927.  
J. T. SMITH  
MOLDING DEVICE  
Filed June 17, 1924  
1,653,232  
2 Sheets-Sheet 2
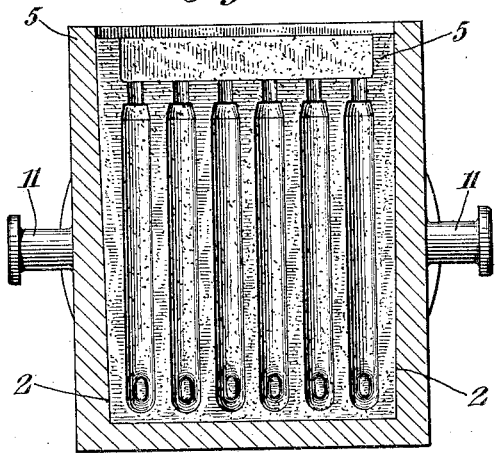
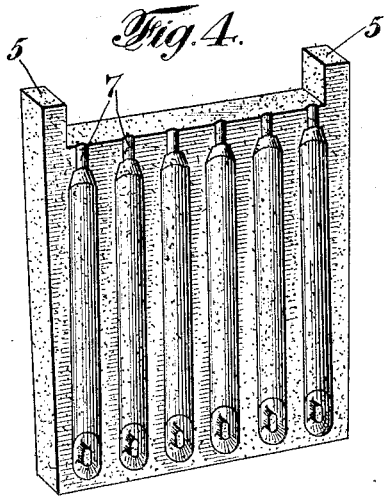
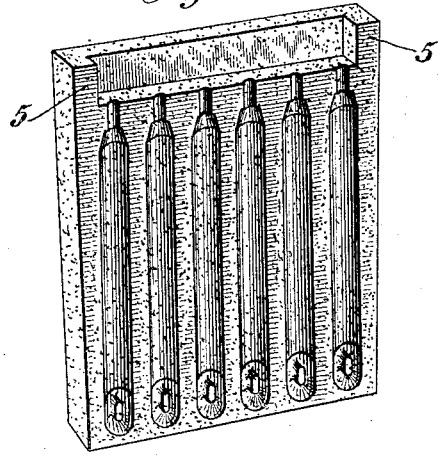
INVENTOR
Joseph Theodore Smith
BY
ATTORNEY Patented Dec. 20, 1927.

1,653,232

UNITED STATES PATENT OFFICE.

JOSEPH THEODORE SMITH, OF PATERSON, NEW JERSEY.

MOLDING DEVICE.

Application filed June 17, 1924. Serial No. 720,530.

This invention relates to an improved molding device, and more specifically to one formed of hard baked sand, or its equivalent, which device is particularly designed for rapid and economical molding operations.

The invention has for an object the provision of a cheap and efficient device for molding various objects in the foundry, and particularly a large number of units at the same time, without loss of metal or burning of the molds, and with the avoidance of any considerable wear and tear on the molding apparatus. A further object is to particularly design an apparatus for making sash weights of high quality, smoothness and soundness. Further objects will appear as the following description proceeds.

In the drawings which form part of this specification a preferred embodiment of the invention is described, and in said drawings,—

Fig. 3 represents a section on line 3—3 of Fig. 1;

Fig. 4 is a perspective view of one half of a mold unit; and

Fig. 5 is a similar view of a half of the mold forming the end of a series of units.

Figure 1:
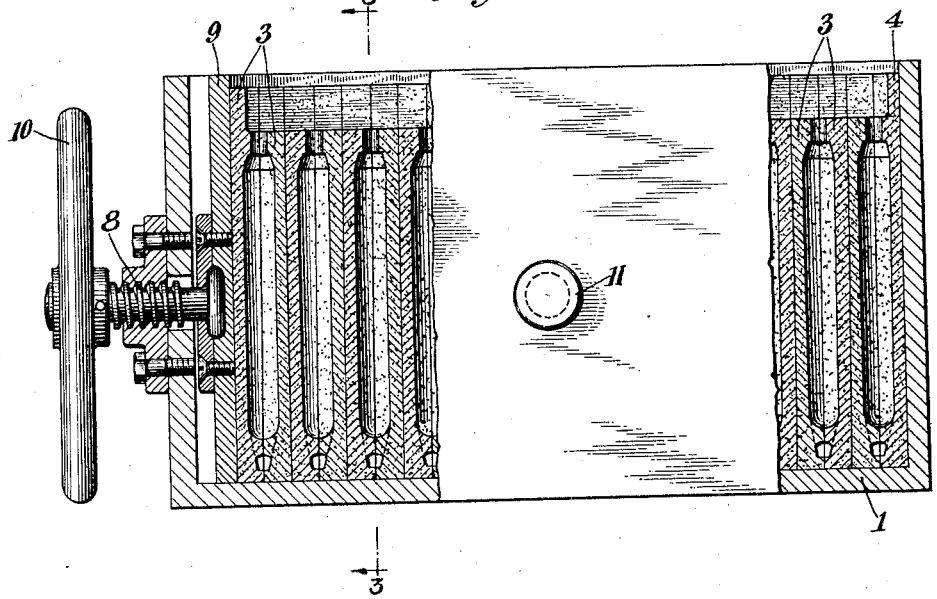
Fig. 1 represents a section of a molding box and molds contained therein.
Figure 2:
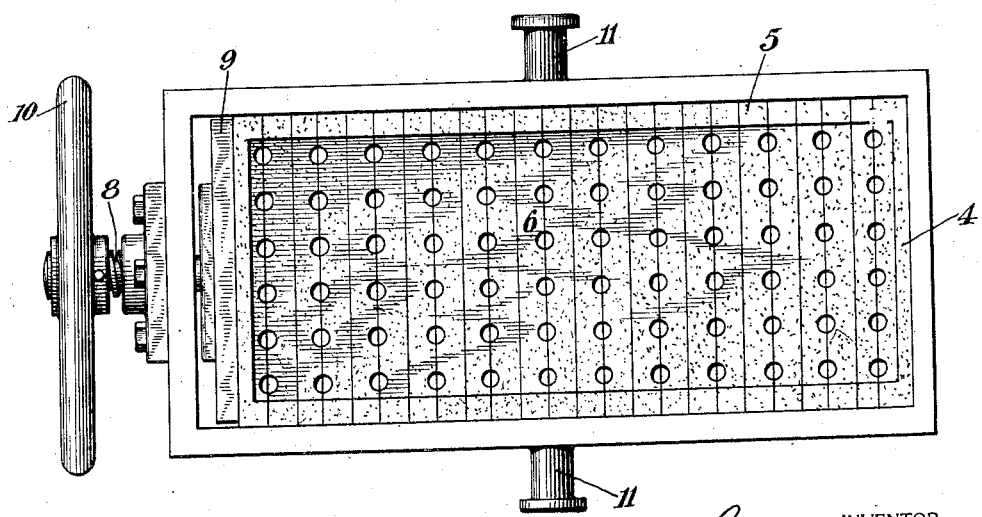
Fig. 2 represents a plan view of Fig. 1.

In said preferred embodiment there is shown a metallic box 1 tapering toward the bottom as shown at 2, and adapted to receive mold units 3, of which there may be any desired number. These units are formed of hard baked sand, prepared by any suitable process, as for example by employing sand mixed with an oil, and baking it to form a coherent unit. Preferably they are made interchangeable, the end units having flanges 4 which cooperate with the sides 5 to form a trough 6 for the reception of metal. In the example shown, the molds are made for casting sash weights, the passages or holes 7 leading from the metal receptacle or reservoir 6, being arranged in the usual manner to flow the metal to the molds. In this manner each mold will be filled without spilling any metal, and there will be but little waste of metal inasmuch as the workman operating the ladle will be able to quickly note when the molds are full.

When the units are placed within the metal container 1, as shown in Fig. 1, they are compressed together by means of a screw 8 operating upon a follower plate 9 and operated by a handle 10. When thus compressed together the closely contacting surfaces of the molds will prevent loss of metal. The metal box 1 may be provided with trunnions 11, adapted to be supported in any suitable manner for moving the box around the foundry.

When the casting operation is finished and the metal has cooled sufficiently, the pressure of the screw is relieved and the molds may then readily be removed from the box, or the box may be inverted and the sash weight castings are dumped out.

Sash weights or other castings thus made will be found to have great soundness and particularly a smooth exterior, due largely to the exact form of the molds, and also to the fact that the latter are closely held together during the casting operation.

It will be understood that besides sash weights a large number of other castings may be made by the use of this apparatus.

As many apparently widely different embodiments of this invention may be made without departing from the spirit thereof, it is to be understood that the invention is not limited to the precise embodiment shown except as indicated in the following claims:

I claim:

1. A molding element formed of hard baked sand and having mold cavities formed in one side thereof, said molding element having a flat top portion with end flanges extending upwardly and openings provided in said flat top portion communicating with said mold cavities, whereby when a plurality of said molding elements are assembled the flat top portion with the upwardly extending flanges will form a receptacle for the molten metal.

2. A molding unit formed of hard baked sand of substantially flat rectangular shape and provided with a plurality of mold cavities in one face thereof, the top portion being flat and provided with upwardly extending flanges at each end.

3. A mold comprising a plurality of pairs of molding elements formed of hard baked sand, one member of each pair being formed with a mold cavity complementary to the mold cavity formed in the other member of the pair, said elements having flat top portions with upwardly extending flanges adapted to cooperate to form a receptacle for the molten metal.

4. A mold comprising a plurality of pairs of molding elements formed of hard baked sand, one member of each pair being formed with a mold cavity complementary to the mold cavity formed in the other member of the pair, said elements having flat top portions with upwardly extending flanges adapted to cooperate to form a receptacle for the molten metal, the end elements being provided with upwardly extending flanges on three sides.

5. A molding apparatus comprising a box, a plurality of molds fitting within the box, said molds being formed by a plurality of pairs of elements of hard baked sand, one element of each pair being provided with a mold cavity complementary to the cavity in the other element of the pair, each element having upwardly extending flanges which cooperate with the flanges of the other elements to provied a receptacle for molten metal on top of the mold and means for compressing the molds together in said box.

In testimony that I claim the foregoing, I have hereunto set my hand this fifth day of June, 1924.

JOSEPH THEODORE SMITH.